(12) United States Patent
Sahoo et al.

(10) Patent No.: US 9,658,992 B2
(45) Date of Patent: May 23, 2017

(54) METHOD AND SYSTEM FOR DISINTEGRATING AN XML DOCUMENT FOR HIGH DEGREE OF PARALLELISM

(75) Inventors: Prabin Ranjan Sahoo, Mumbai (IN); Dattatraya Mohan Tendulkar, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 608 days.

(21) Appl. No.: 13/698,072

(22) PCT Filed: May 18, 2011

(86) PCT No.: PCT/IN2011/000345
§ 371 (c)(1),
(2), (4) Date: Jan. 14, 2013

(87) PCT Pub. No.: WO2011/148385
PCT Pub. Date: Dec. 1, 2011

(65) Prior Publication Data
US 2014/0149852 A1  May 29, 2014

(30) Foreign Application Priority Data

May 24, 2010  (IN) .................. 1600/MUM/2010

(51) Int. Cl.
| | | |
|---|---|---|
| G06F 17/00 | (2006.01) | |
| G06F 17/22 | (2006.01) | |
| G06F 17/27 | (2006.01) | |
| G06F 17/21 | (2006.01) | |
| G06F 17/30 | (2006.01) | |

(52) U.S. Cl.
CPC ........ *G06F 17/2247* (2013.01); *G06F 17/218* (2013.01); *G06F 17/227* (2013.01); *G06F 17/2264* (2013.01); *G06F 17/27* (2013.01); *G06F 17/272* (2013.01); *G06F 17/2705* (2013.01); *G06F 17/30914* (2013.01)

(58) Field of Classification Search
CPC .............. G06F 17/2247; G06F 17/218; G06F 17/2264; G06F 17/227; G06F 17/27; G06F 17/2705; G06F 17/272; G06F 17/30914
USPC ........................................................ 715/239
See application file for complete search history.

(56) References Cited

U.S. PATENT DOCUMENTS

| | | |
|---|---|---|
| 6,631,379 B2 | 10/2003 | Cox |
| 7,747,633 B2 | 6/2010 | Kadiyska et al. |

(Continued)

OTHER PUBLICATIONS

Robert Tolksdorf, "A Dependency Markup Language for Web Services", 2003 © Springer-Verlag Berlin Heidelberg, pp. 12.*

(Continued)

*Primary Examiner* — Chau Nguyen
(74) *Attorney, Agent, or Firm* — Ohlandt, Greeley, Ruggiero & Perle, LLP

(57) ABSTRACT

The present invention relates to the field of high performance computation. Particularly, the invention relates to converting a huge XML document into SDML format which can be processed with high degree of parallelism to achieve high performance. In addition also SDML can be used as a standalone protocol for data representation. SDML deals with one time write and many times read. Further, SDML files can be splitted on number of lines which makes it easier to distribute among multi cores and even distributing across servers.

5 Claims, 5 Drawing Sheets

(56) References Cited

U.S. PATENT DOCUMENTS

| | | | |
|---|---|---|---|
| 7,836,063 B2 | 11/2010 | Salazar et al. | |
| 8,250,464 B2 | 8/2012 | Dang et al. | |
| 8,782,514 B1* | 7/2014 | Chiu | G06F 17/2247 707/790 |
| 2002/0099735 A1* | 7/2002 | Schroeder et al. | 707/513 |
| 2002/0112224 A1 | 8/2002 | Cox | |
| 2002/0152166 A1* | 10/2002 | Dutta | G06Q 20/04 705/43 |
| 2002/0188520 A1* | 12/2002 | Willner et al. | 705/26 |
| 2005/0131970 A1 | 6/2005 | Salazar et al. | |
| 2005/0138052 A1* | 6/2005 | Zhou et al. | 707/101 |
| 2006/0294216 A1* | 12/2006 | Swanson | G06Q 30/02 709/223 |
| 2007/0182978 A1* | 8/2007 | Nakamura et al. | 358/1.13 |
| 2007/0288885 A1 | 12/2007 | Brunel et al. | |
| 2008/0313212 A1* | 12/2008 | Yu | G06F 17/2725 |
| 2009/0006944 A1* | 1/2009 | Dang | G06F 17/272 715/234 |
| 2009/0030921 A1 | 1/2009 | Kadiyska et al. | |
| 2009/0089658 A1* | 4/2009 | Chiu | G06F 17/2705 715/234 |
| 2010/0043008 A1 | 2/2010 | Marchand | |
| 2011/0072319 A1* | 3/2011 | Agarwal | G06F 17/30917 714/49 |
| 2011/0153604 A1* | 6/2011 | Yu | G06F 17/2247 707/737 |

OTHER PUBLICATIONS

Michael R. Head and Madhusudhan Govindaraju, "Performance Enhancement with Speculative Execution based Parallelism for Processing Large-Scale XML-based Application Data", HPDC 2009, Grid Computing Research Laboratory, Department of Computer Science Binghamton University, pp. 47.*

Michael R. Head and Madhusudhan Govindaraju, "Parallel Processing of Large-Scale XML-Based Application Documents on Multi-core Architectures with PiXiMal", 2008, Grid Computing Research Laboratory, SUNY Binghamton, NY, pp. 9.*

Pan et al., "A Static Load-Balancing Scheme for Parallel XML Parsing on Multicore CPUs", Apr. 11, 2007, Department of Computer Science, State University of New York, Binghamton, Computer Science Department, Indiana University, pp. 11.*

Head et al., "Parallel Processing of Large-Scale XML-Based Application Documents on Multi-core Architectures with PiXiMaL", Oct. 9, 2008, www.cs.binghamton.edu/~mgovinda/papers/head-Parallel.pdf, pp. 9.*

International Search Report dated Dec. 5, 2011 corresponding to International Patent Application No. PCT/IN11/00345.

* cited by examiner

METHOD AND SYSTEM FOR DISINTEGRATING AN XML DOCUMENT FOR HIGH DEGREE OF PARALLELISM

FIELD OF THE INVENTION

The present invention relates to the field of high performance computation. Particularly, the present invention relates to converting a huge XML file into modified simple dependency markup language (SDML) which can be processed with high degree of parallelism to achieve high performance in a multicore technology environment.

BACKGROUND OF THE INVENTION

Now days, as a World Wide Web Consortium (W3C) recommended general-purpose markup language, eXtensible Markup Language (XML) has been widely used in various applications, such as Web Service, Database, etc. XML defines a common grammar to represent data with simple and human-readable markups, and, for example, can appear as a configuration file, a database file, etc. For many XML-based applications, especially database and Web Service, response time is one critical performance criterion. Different applications have different requirements for the response time. For example, in an Online Transaction Processing (OLTP) system of a large bank, the response time is usually required to be 100 ms or less, and larger response time will cause the discomfort of users.

The response time of XML-based applications consists of many parts, where the time for XML parsing is inescapable. Since XML parsing involves many time-consuming operations, such as coding conversion, tokenization, well-formed checking, and Document Type Definition (DTD)/XML schema validation, it becomes a performance bottleneck in many XML-based applications, and occupies a main part of the response time. More particularly, some applications use huge XML documents. For example, in life science and content management, XML documents of Megabytes (MBs) are very popular, and even in some case, XML documents of Gigabytes (GBs) are needed. Such large XML documents further exacerbate parsing performance. Generally, time spent on parsing a huge XML document would be dozens of seconds, which is usually unacceptable.

Technology Challenges

Over the years the processor technology evolution has come a long way from single processing technology to the latest multicore technology. Evolution of Processor Technology can be given by: single threaded processor technology->symmetric multiprocessing using celeron dual (SMP) technology->simultaneous multithreading (SMT) HT technology->multicore processing technology.

While today's commodity processors are equipped with multiple cores which facilitates to achieve parallelism but most of the applications are not capable of exploiting this multicore mechanism. The traditional approach of sequential application development needs further evolutions. The need for paradigm shift from sequential approach to parallel approach is prominent. The need for developing new tools, frameworks is for parallel processing inevitable.

Performance Challenges

With the globalization effect, the demand for data processing has increased significantly. Business organizations are facing huge challenges to cope up with processing high volumes of transactions. The technology advancement has also increased the level of expectation of the consumers. The need of the hour is to provide information not only faster but also concisely with accurate precisions. This has opened the opportunities for Parallel processing design. It is difficult to imagine how life would have been without Google's map-reduce technology and Yahoo's Hadoop framework. Map-reduce framework plays an important role in parallel computation. Huge XML files are highly difficult to process in parallel, not suitable for high level of parallel processing need. However, XML is popular standard for data representation and widely used.

Several inventions have been made in this domain some of them known to us are described below:

US Publication 20090006944 discloses a method and system for parsing a markup language document wherein the method comprises: pre-splitting a body of the markup language document into plurality parts; scanning each of the plurality parts, wherein while each of the parts is scanned, the scanning of the part is stopped only when a specific mark is found, and then a stop point at which the scanning is stopped is recorded; splitting the body of the markup language document into a plurality of fragments using the respective stop points; parsing the plurality of fragments in parallel and producing parsing results for the respective fragments; and combining the parsing results for the respective fragments to form a parsing result for the markup language document. However, the integrated space consumption of the fragments put together is relatively same or more as that of the original huge XML document.

This invention employs a XML splitting and scanning technique which requires the system to scan through each part of the original XML document for identification of predefined marks, this necessitate the system to frequently access each part of the XML document, which is a time consuming task and seldom would able to exploit advantages of parallel processing. Also, SDML is one time write and many times read, which means once the SDML is created there is no need of applying any rules of pre-splitting again the original XML document.

US Publication 20090089658 discloses a method of parsing a hierarchically organized data document, comprising the steps of: preparsing the data document to determine a logical tree structure; automatically dividing the data document into a plurality of sections, in dependence on the logical tree structure, each section comprising at least a beginning of a logical section of the logical tree structure, with sufficient context to resolve any ambiguities; and automatically distributing the plurality of sections to a plurality of processors for concurrent parsing of the sections of the data structure. However, this document also works directly on XML document rather than converting it into another simple format for distributing the converted parts among multi cores and even distributing across servers for saving the time of preparsing process for logical division into plurality sections, each time a XML document is loaded for processing. SDML is one time write and many times read, which means once the SDML is created there is no need of applying any rules of pre-splitting again the original XML document.

All the above mentioned prior-arts fail to recognize the potential of converting a huge XML document into an intermediate format for once write and many read, which can be processed with high degree of parallelism not only within a multicore server but also across multicore servers.

In order to solve the above mentioned problems, the present invention proposes a system and method for converting a huge XML document and intro a format and structure which can be processed with high degree of parallelism to achieve high processing performance in the multicore environment.

Other features and advantages of the present invention will be explained in the following description of the invention having reference to the appended drawings.

OBJECT OF THE INVENTION

The primary object of the invention is to speed up the processing of huge XML document by converting into SDML format which can be processed in parallel.

Another object of the invention is to present the converted SDML format as a stand alone protocol for data representation.

SUMMARY OF THE INVENTION

The present invention relates to the field of high performance computation. Particularly, the present invention relates to converting a huge XML document into modified simple dependency markup language (SDML) which can be processed with high degree of parallelism to achieve high performance. According to one embodiment of the invention, the SDML format can be used as a standalone protocol for data representation.

BRIEF DESCRIPTION OF THE ACCOMPANYING DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific system and method disclosed in the drawings.

DETAIL DESCRIPTION OF THE INVENTION

Figure 1:
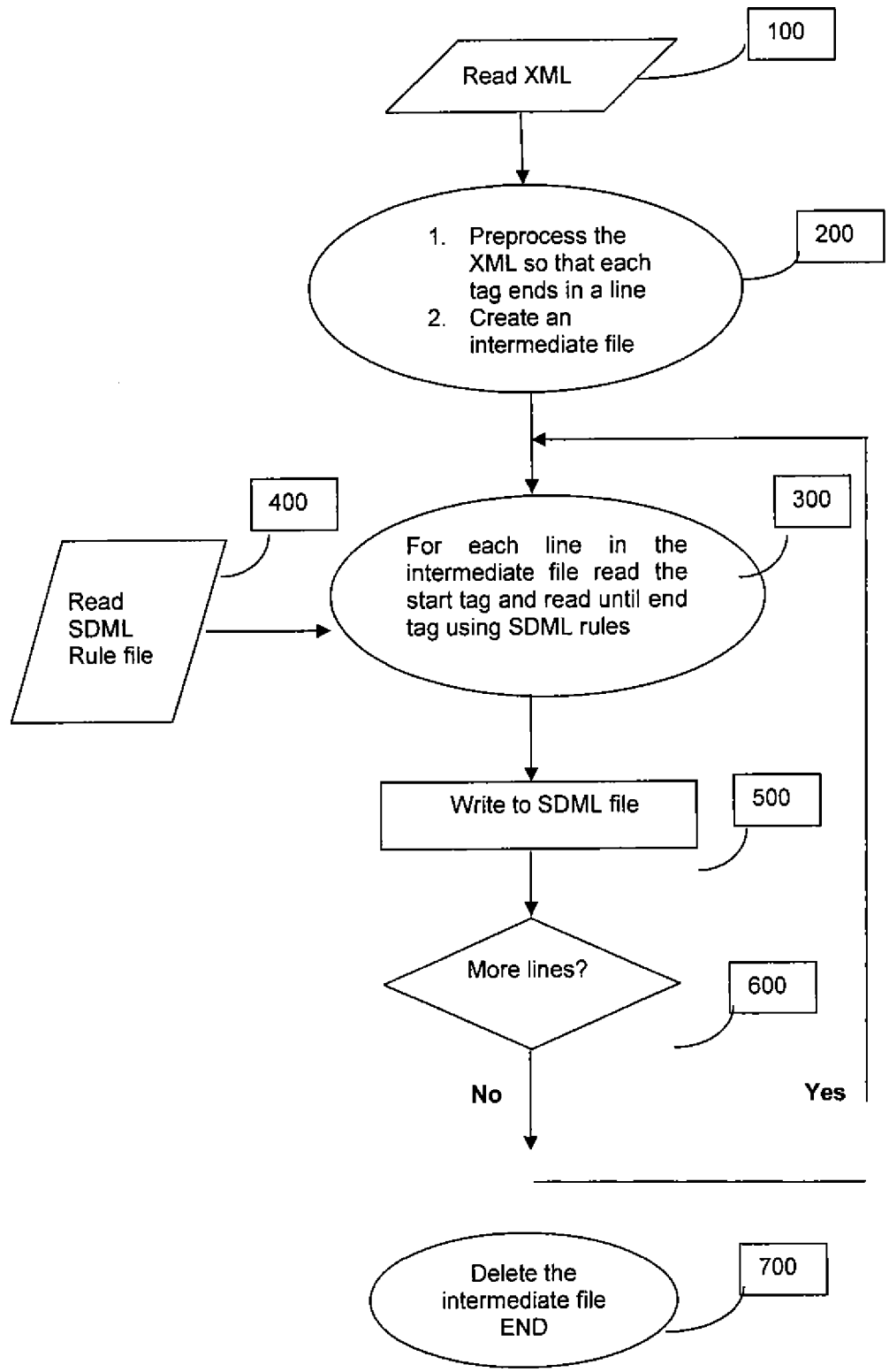
FIG. 1 illustrates a typical method for converting an XML document into SDML file format.

Some embodiments of this invention, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any methods, and systems similar or equivalent to those described herein can be used in the practice or testing of embodiments of the present invention, the preferred methods, and systems are now described.

The present invention provides a method for an efficient computation of large XML file, the said method comprising the computer implemented step of:

reading an XML file having plurality of XML notations arranged in plurality of lines wherein each XML notation representing an element of a record and the said XML notation ending with a tag in the respective line;

converting the said XML file into an Intermediate XML file wherein multiple XML notations are arranged in a line with tags of each notations ending in the said line;

applying SDML rule to the said intermediate XML file; wherein each element of an XML file is read without missing any info while conversion to SDML;

enabling the processing of the XML file in a multicore computing environment so that when the SDML file is splitted across several servers, each server gets its local copy for faster processing of the large XML file;

SDML (Simple Dependency Markup Language) is a simpler mechanism and attempts to provide maximum parallelism. This does not require complex XML parsers, complex data structures. SDML data is represented through string with each line representing a record. That is why simple string search, string manipulation can achieve what XML parsers can achieve. Data can even be represented in SDML format directly without using XML as below. However, SDML does not provide any tool to create SDML directly at present.

In its current form the XML file is first converted to SDML format. Any application which wants to read the SDML uses SDML library to split the file with offsets depending on the number of cores and maps each core with a begin offset and end offset. Each core starts reading the file from the given offset till the end offset. The library takes care of reading from the start of line on a given offset so that a complete line is processed at a time.

The motivation behind SDML is to convert the huge XML to SDML format for two reasons i) easy of parsing through string manipulations, and ii) to process each SDML element in parallel using the latest multicore servers to gain high performance.

SDML notation is simple like XML. For example let us take an example of a XML document to explain this concept. The following XML document contains information of two employees of company xyz.

```
<Employees>
    <Employee id="10000000000">
        <name>Albert Bevan</family>
        <company>xyz</company>
    </Employee>
    <Employee id="20000000000">
        <name> Charlie David</name>
        <company>xyz</company>
    </Employee>
</ Employees>
```

In SDML we can represent the same info as below.

Employees->Employee (id="10000000000")->name::Albert Bevan->company::xyz

Employees->Employee (id="20000000000")->name::Charlie David->company::xyz

"->" Represents dependency ( ) Attributes are grouped inside parenthesis

:: Represents the value associated with an element

" " Quotes for attributes

This requires at minimum to represent the XML document into SDML format. A huge SDML file with above template could consume less disk space than XML document. Each line in a SDML is an independent chain of entities, which can be parsed, processed by a core or thread. Any developers who are conversant with string handling in any language can write a parser, process the data. The parallel factor "P" in Amdahl's theory increases as each line is independent from the other. Therefore if number of cores increases, the parallel processing also improves.

One of the aspects of the present invention is that SDML provides a mechanism to represent data which are generally represented through XML. The motivation behind SDML is to process data in parallel to achieve high degree of parallelism. Though there are tools/frameworks for parallel processing of XML, but because of the complexities in XML parsing, true parallelism is difficult to achieve.

Model and Architecture

According to one embodiment of the invention, the architecture tries to maximize the parallelism factor based on Amdahl's law.

Amdahl's law states that if P is the proportion of a program that can be made parallel (i.e. benefit from parallelization), and (1−P) is the proportion that cannot be parallelized (remains serial), then the maximum speed up that can be achieved by using N processors is:

$$1/((1-P)+P/N);$$

In the limit, as N tends to infinity, the maximum speedup tends to 1/(1−P). In practice, performance/price falls rapidly as N is increased once there is even a small component of (1−P). As an example, if P is 90%, then (1−P) is 10%, and the problem can be speed up by a maximum of a factor of 10, no matter how large the value of N used. Which means parallel computing is only useful for either small numbers of processors, or problems with very high values of P. SDML focuses on maximizing P.

FIG. 1 illustrates a typical method for converting an XML document into SDML file format according to one embodiment of the invention. In step 1, typically a huge XML file is given as input for processing. Step 2 preprocesses the XML file and creates an intermediate XML file by reading XML notations line by line (100). The preprocessing is intended to simplify and reorganize the XML file in a manner that each tag end in a line, in the intermediate file (200) related tags are organized in a line. In the next step, thus organized intermediate XML file is subjected to SDML rule (400) wherein each line in the intermediate file reads the start tag until the end tag using predefined SDML rules (400) and information (300). Thus scanned intermediate XML file upon application of SDML rules is converted into a SDML file (500), wherein each line starts with a start tag and ends with a end tag, resulting in the aggregation of a record in a single line. Each line is converted to represent a record and is written to the SDML file (500), iteratively the system checks if more lines are left or not (600). Till the last available line in the intermediate file (600), the system writes the converted code to the SDML file. Upon completing the SDML conversion, subsequently, the intermediate file (600) is deleted, leaving converted SDML file for further processing.

Figure 2:
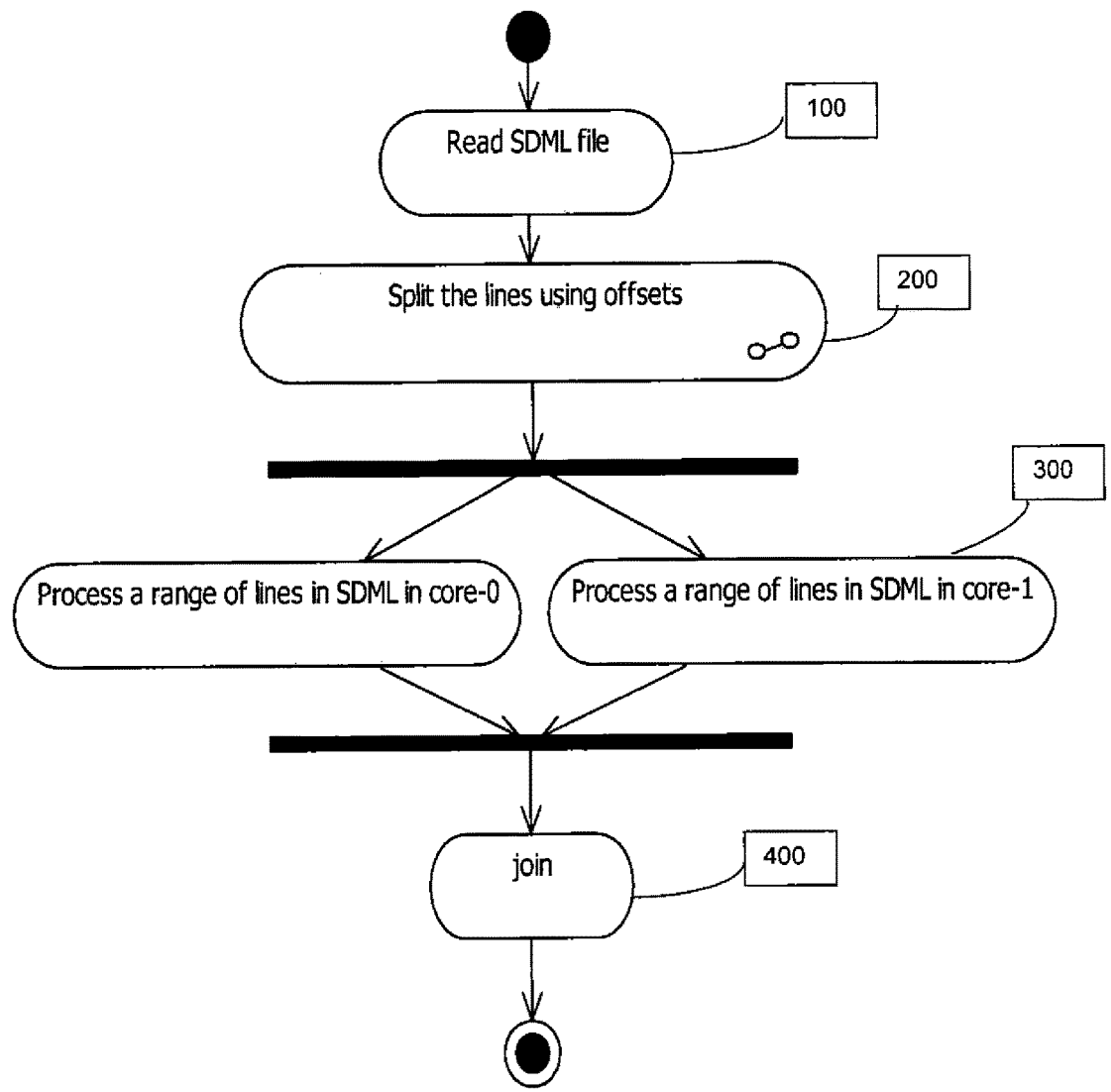
FIG. 2 illustrates a typical method of SDML processing logic maps to multicore processor using Unified Modeling Language (UML) notation.

FIG. 2 illustrates the SDML processing logic which maps to multicore processor using Unified Modeling Language (UML) notation according to another embodiment of the invention. The system reads the SDML document line by line (100). Further, SDML files are splitted based on the number of lines into SDML fragments using a predefined offset (200). The splitting of the SDML file makes it easier to distribute among multi cores for evenly distributing across servers. The system forwards each SDML fragment for parsing and processing to core-0, next SDML fragment to core-1 (300) and like so on. The SDML framework supports parallel processing through multicore processors. Upon parallely processing all the fragments, the processing resultants of all the lines in SDML fragments are combined into one SDML file (400).

Figure 3:
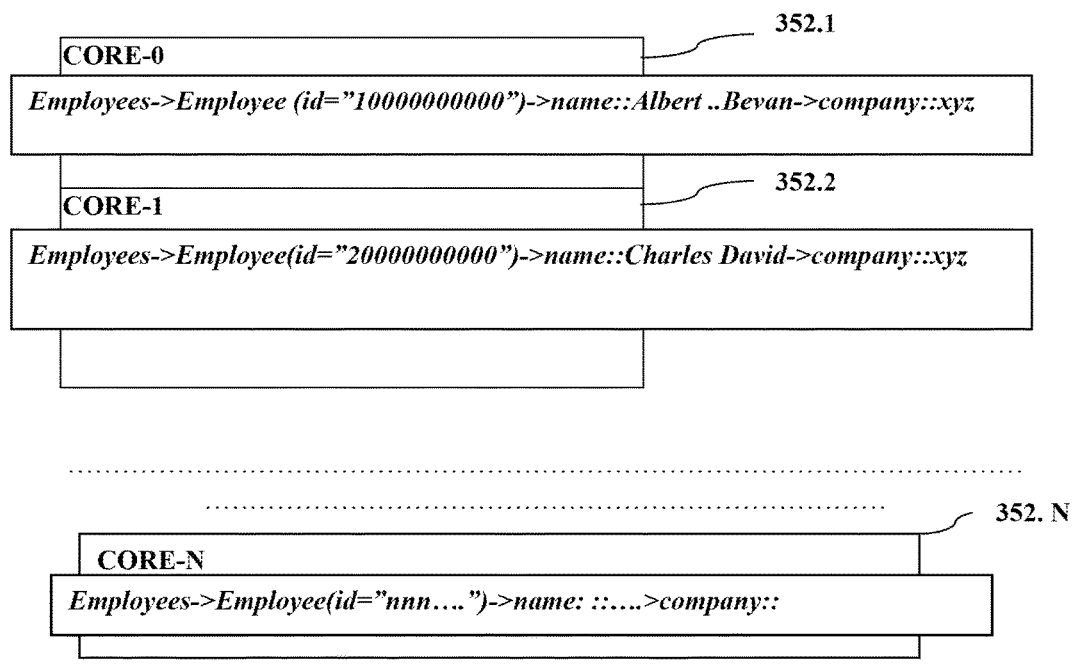
FIG. 3 illustrates an overview of the framework in accordance with the present invention.

FIG. 3 illustrates a typical SDML processing across multicores in accordance with the framework envisaged for the present invention. It depicts the parallel processing technique of the SDML fragments in the respective cores in the multi core processor. This architecture plays an important role in parallel computation in multicore technology environment as SDML deals with one time write and many times read.

Let us consider an XML file as below:

```
<householders>
    <Household>
        <id> 1</id>
        <memberID>100</memberID>
        <name> Andrew</name>
        <inclome>1000</income>
    </Household>
    <Household>
        <id> 1</id>
        <memberID>101<memberID>
        <name> Brian</name>
        <inclome>2000</income>
    </Household>
    <Household>
        <id> 2</id>
        <memberID>103</memberID>
        <name> Charlie</name>
        <inclome>4000</income>
    </Household>
</Households>
```

Converting this to SDML would yield:
households->household->id::1->member->id::100->name::Andrew->income::10000
households->household->id::1->subscriber->id::101->name::Brian->income::20000
households->household->id::2->subscriber->id::103->name::Charlie->income::40000

Figure 4:
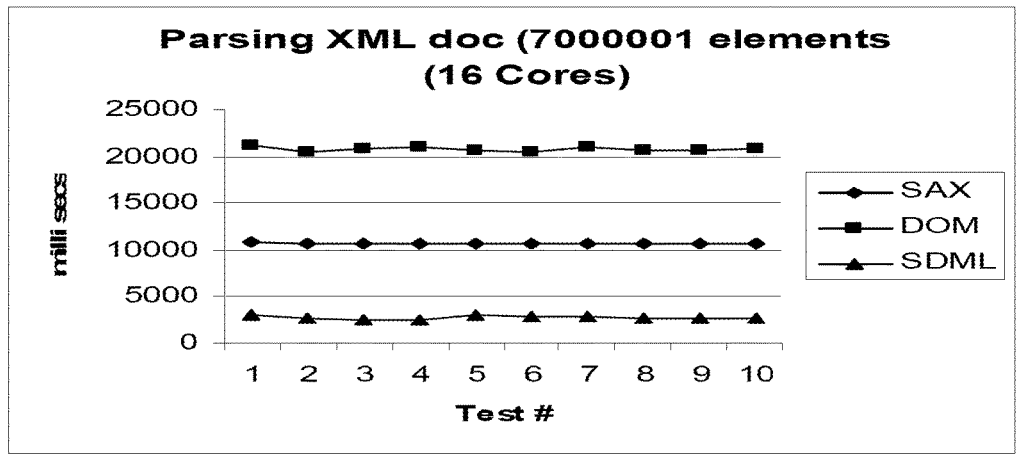
FIG. 4 illustrates a comparison of XML processing using SAX parser, DOM parser as is form and SDML in multicore with 16 Cores.

FIG. 4 illustrates a comparison of XML processing using SAX parser, DOM parser as is form and SDML in multicore with 16 Cores. The graph shows effectiveness of SDML over DOM and SAX parser considering 16 cores parallel processing. Specifically, FIG. 4 shows a comparison of performance of typical parsers such as SAX parser, DOM parser with the SDML using 16 cores. The graph shown in FIG. 4 shows number of tests on x-axis and the performance in milliseconds on y-axis in order to parse the XML document.

Figure 5:
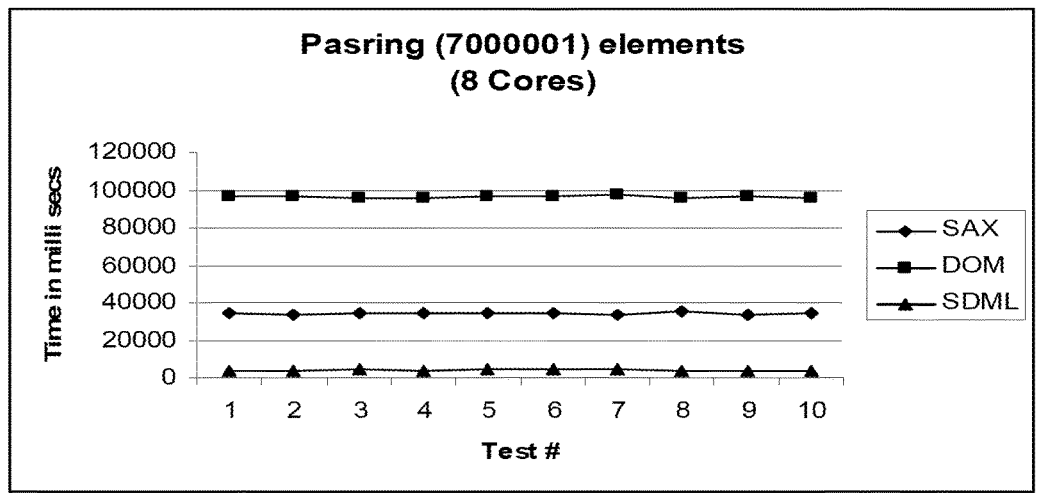
FIG. 5 illustrates a comparison of XML processing using SAX parser, DOM parser as is form and SDML in multicore with 8 Cores.

FIG. 5 illustrates a comparison of XML processing using SAX parser, DOM parser as is form and SDML in multicore with 8 Cores. The graph shows effectiveness of SDML over DOM and SAX parser Considering 8 cores parallel processing. FIG. 5 shows a comparison of performance of typical parsers such as SAX parser, DOM parser with the SDML using 8 cores. The graph shown in FIG. 5 shows number of tests on x-axis and the performance in milliseconds on y-axis in order to parse the XML document.

Figure 6:
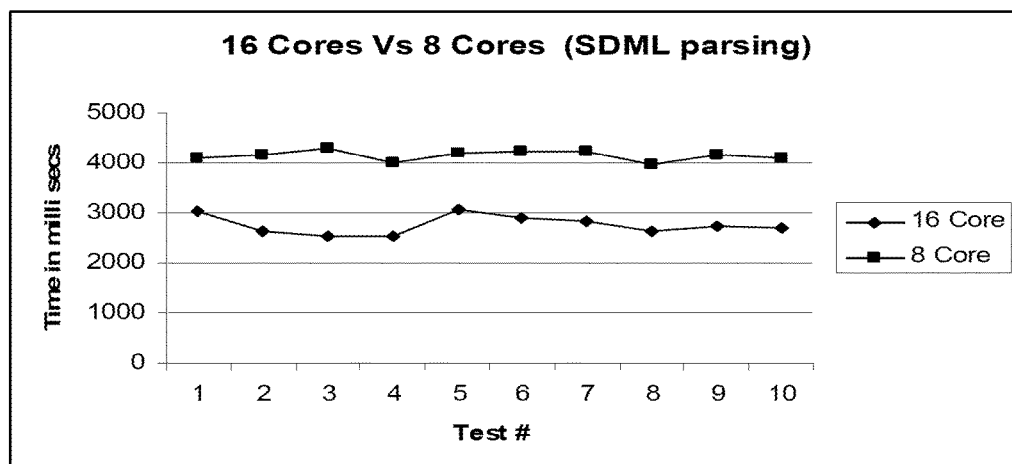
FIG. 6 illustrates a graph showing SDML processing in 8 cores Vs 16 cores.

FIG. 6 illustrates a graph showing SDML processing effectiveness while employing 8 cores against 16 cores for SDML processing. The graph illustrates that 16 cores are more effective than 8 cores in SDML parallel processing. FIG. 6 shows a comparison of performance of multicore processor using 8 cores and 16 cores. The graph shown in FIG. 6 shows number of tests on x-axis and the performance in milliseconds on y-axis in order to parse the XML document.

According to one embodiment of the invention, the SDML rule file is simple and said rule file is defined as below:

```
<employees>
    <employee>
    </employee>
<employees>
```

This means convert the XML document which starts with root <employees> and <employee> </employee> is the plurality parts. For example the SDML converter script uses this rule to create the first SDML line as below:
employees->defaults->salary(currency="dollar")::
  4000->employee->name::Michale
Bollingar->empid::178645->salary(currency="dollar")::
  6000->grade::1

This helps to read each element of an XML without missing any info while converting to SDML. This XML file is having a default section, this is repeated to help to process the XML file in a multicore technology environment so that when this SDML file is splitted across several servers, each server gets its local copy for faster processing.

BEST MODE/EXAMPLE OF WORKING OF THE INVENTION

The invention is described in the example given below which is provided only to illustrate the invention and therefore should not be construed to limit the scope of the invention.

We have a XML document which contains the employee details as below:

```
<employees>
    <defaults>
        <salary currency="dollar">4000</salary>
    </defaults>
    <employee>
        <name>Michale Bollingar</name>
        <empid>178645</empid>
        <salary currency="dollar">6000</salary>
        <grade>1</grade>
    </employee>
    <employee>
        <name>Steve Bollingar</name>
        <empid>178655</empid>
        <salary currency="Rupees">16000</salary>
        <grade>1</grade>
    </employee>
    <employee>
        <name>Xinan Calmlin</name>
        <empid>178646</empid>
        <salary currency="dollar">7000</salary>
        <grade>2</grade>
    </employee>
    <employee>
        <name>Charlene Konix</name>
        <empid>178646</empid>
        <salary currency="dollar">8000<salary>
        <grade>2</grade>
    </employee>
    <employee>
        <name>Dognier Bollingar</name>
```

-continued

```
        <empid>178647</empid>
        <salary currency="dollar">9000</salary>
        <grade>2</grade>
    </employee>
    <employee>
        <name>Tom sc</name>
        <empid>178648</empid>
        <salary currency="dollar">10000</salary>
        <grade>3</grade>
    </employee>
    <employee>
        <name>Charlie smith</name>
        <empid>178649<empid>
        <salary currency="dollar">15000</salary>
        <grade>3</grade>
    </employee>
    <employee>
        <name>Dock I</name>
        <empid>178650</empid>
        <salary currency="dollar">20000</salary>
        <grade>3</grade>
    </employee>
    <employee>
        <name>Robert Maria</name>
        <empid>178651</empid>
        <salary currency="dollar">25000</salary>
        <grade>4</grade>
    </employee>
    <employee>
        <name>Scott Maria</name>
        <empid>178651</empid>
        <salary currency="dollar">30000</salary>
    <grade>4</grade>
    </employee>
<employees>
```

Step1:
Convert the XML into SDML format.
Step2:
After the conversion, the SDML file now contains:
employees->defaults->salary(currency="dollar")::
  4000->employee->name::Michale   Bollingar->empid::
  178645->salary(currency="dollar")::6000->grade::1
employees->defaults->salary(currency="dollar")::
  4000->employee->name::Steve   Bollingar->empid::
  178655->salary(currency="Rupees")::16000->grade::1
employees->defaults->salary(currency="dollar")::
  4000->employee->name::Xinan   Calmlin->empid::
  178646->salary(currency="dollar")::7000->grade::2
employees->defaults->salary(currency="dollar")::
  4000->employee->name::Charlene   Konix->empid::
  178646->salary(currency="dollar")::8000->grade::2
employees->defaults->salary(currency="dollar")::
  4000->employee->name::Dognier   Bollingar->empid::
  178647->salary(currency="dollar")::9000->grade::2
employees->defaults->salary(currency="dollar")::
  4000->employee->name::Tom  sc->empid::178648->salary(currency="dollar")::10000->grade::3
employees->defaults->salary(currency="dollar")::
  4000->employee->name::Charlie   smith->empid::
  178649->salary(currency="dollar")::15000->grade::3
employees->defaults->salary(currency="dollar")::
  4000->employee->name::Dock  l->empid::178650->salary(currency="dollar")::20000->grade::3
employees->defaults->salary(currency="dollar")::
  4000->employee->name::Robert Maria->empid::
  178651->salary(currency="dollar")::25000->grade::4
employees->defaults->salary(currency="dollar")::
  4000->employee->name::Scott Maria->empid::
  178651->salary(currency="dollar")::30000->grade::4

This SDML file is one time conversion of the above XML document.

Now lets us find out the total sum of salary for employees belonging to each grade. For example total sum of salary for grade 1 with currency "dollar" and so on.

Step3:
i) Read the SDML file
   a. As per the size of SDML file, divide into a set of offsets depending on the number of cores, and assigning start and end offset to each core
ii) Now each core,
   a. Seeks to the start of offset, and computes to start reading from the beginning of a line from SDML document.
   b. Read the line
   c. Look for tag "employee", and after employee read
      For example:
      Employee->name::Dock 1->empid::178650->salary (currency="dollar")::20000->grade::3
   d. Split with "->", and for each token (
      i. Look for attribute "dollar"
      ii. If the attribute is "dollar", then read the salary for the grade (in this case 20000 for grade 3)
      iii. Sum the value and store the partial sum in a core variable. The core variable is separate for each partial sum (sum_gr_1 for grade 1, sum_gr_2 for garde 2 and so on)
   e. Repeat step b above for each line until the end of offset is reached.
   f. Now once all the cores finished their computation
iii) The main application reduces the final sum for each grade from each core.
iv) Finally we get the output as:
   Grades Total Salary (dollars)
   Grade-1 6000
   Grade-2 24000
   Grade-3 45000
   Grade-4 55000

The output shows Grade-1 as 6000 because we have put a condition only to add for those whose currency is in dollar.

The invention claimed is:

1. A method for processing an Extensible Markup Language (XML) file, the method comprising:
   receiving, by a multicore processor, an Extensible Markup Language (XML) file comprising a plurality of Extensible Markup Language (XML) notations, wherein the plurality of XML notations are arranged in a plurality of lines, wherein each XML notation of the plurality of XML notations indicates an element of a record comprising information, and wherein each XML notation comprises tags at start and end of a line in the plurality of lines;
   preprocessing, by the multicore processor, the XML file only once to create an intermediate XML file by reading the plurality of XML notations line by line in order to reorganize the XML file in a manner that each tag ends in a line, wherein related tags are organized in a line in the intermediate XML file;
   converting, by the multicore processor, the intermediate XML file into a Simple Dependency Markup Language (SDML) file by reading start tags till end tags of the plurality of XML notations in the plurality of lines, wherein each line in SDML file starts with a start tag and ends with an end tag resulting in an aggregation of record in a single line;
   iteratively checking, by the multicore processor, if more lines are available in the intermediate XML file for conversion into the SDML file, wherein upon completion of the conversion of the intermediate XML file into the SDML file, the intermediate XML file is deleted;
   splitting, by the multicore processor, the SDML file into a plurality of SDML fragments such that the plurality of SDML fragments are distributed across cores of the multicore processor in order to parse the plurality of SDML fragments parallelly; and
   combining, by the multicore processor, resultants of the parsed plurality of SDML fragments to create a Previously presented Simple Dependency Markup Language (SDML) file.

2. The method of claim 1, wherein the SDML file is split in parallel using a Unified Modeling Language (UML) notation.

3. The method of claim 1, wherein the SDML file is split into a plurality of SDML fragments such that the plurality of SDML fragments are distributed across a plurality of servers wherein a server of the plurality of servers comprises a multicore processor.

4. The method of claim 1, wherein the SDML files are split based on the number of lines into the SDML fragments.

5. The method of claim 1, wherein the SDML files are split based on the number of cores and maps, each core having a start offset and end offset wherein each core starts reading the file from the given offset till the end offset.

* * * * *